United States Patent
Inoue (10) Patent No.: US 6,947,113 B2
(45) Date of Patent: Sep. 20, 2005

(54) METHOD OF FABRICATING LIQUID CRYSTAL DISPLAY DEVICE

(75) Inventor: Daisuke Inoue, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 237 days.

(21) Appl. No.: 10/174,010

(22) Filed: Jun. 18, 2002

(65) Prior Publication Data

US 2002/0196406 A1 Dec. 26, 2002

(30) Foreign Application Priority Data

Jun. 20, 2001 (JP) .................................. 2001-187224

(51) Int. Cl.⁷ .......................................... G02F 1/1337
(52) U.S. Cl. ..................................... 349/124; 349/187
(58) Field of Search .............................. 349/124, 161, 349/187, 191, 1

(56) References Cited

U.S. PATENT DOCUMENTS 5,750,041 A * 5/1998 Hirane ..................... 210/795
6,118,511 A * 9/2000 Ohno et al. ................. 349/158

FOREIGN PATENT DOCUMENTS

| JP | 59-182422 | * 10/1984 |
| JP | 5-333337 | * 12/1993 |
| JP | 10-142603 | 5/1998 |
| JP | 11-95219 | 4/1999 |
| JP | H11-264978 | 9/1999 |
| JP | H12-002809 | 1/2000 |
| KR | 1999-59984 | 7/1999 |

OTHER PUBLICATIONS

Partial English translation of JP 11–264978–9 pages–Sep. 1999.*

* cited by examiner

Primary Examiner—Dung T. Nguyen
Assistant Examiner—Tai Duong
(74) Attorney, Agent, or Firm—Choate, Hall & Stewart, LLP (57) ABSTRACT

A method of fabricating a liquid crystal display device, includes the steps of (a) coating a material of which an alignment film is composed, on first and second substrates, (b) blowing gas to a surface of the material to dry the material, (c) rubbing the material for forming the alignment film, (d) arranging the first and second substrates such that the alignment films formed on the first and second substrates face each other, and filling a gap formed between the first and second substrates with liquid crystal.

15 Claims, 6 Drawing Sheets

METHOD OF FABRICATING LIQUID CRYSTAL DISPLAY DEVICE

BACKGROUND OF THE INVENTION

1. Field of the Invention

The invention relates to an apparatus for drying a material of which an alignment film is composed in a process of fabrication of a liquid crystal display device, a method of drying the same, and a method of fabricating a liquid crystal display device, and more particularly to such an apparatus and methods both of which are capable of, when a material of which an alignment film is composed and which is comprised of organic solvent into which polyimide and/or polyamic acid is dissolved is dried, uniformly removing such organic solvent from the material.

2. Description of the Related Art

An alignment film in a liquid crystal display device, after being rubbed, aligns liquid crystal molecules in a single direction, and defines a pre-tilt angle. A pre-tilt angle is much influenced further by steps of forming an alignment film, to be carried out before the alignment film is rubbed.

Figure 1:
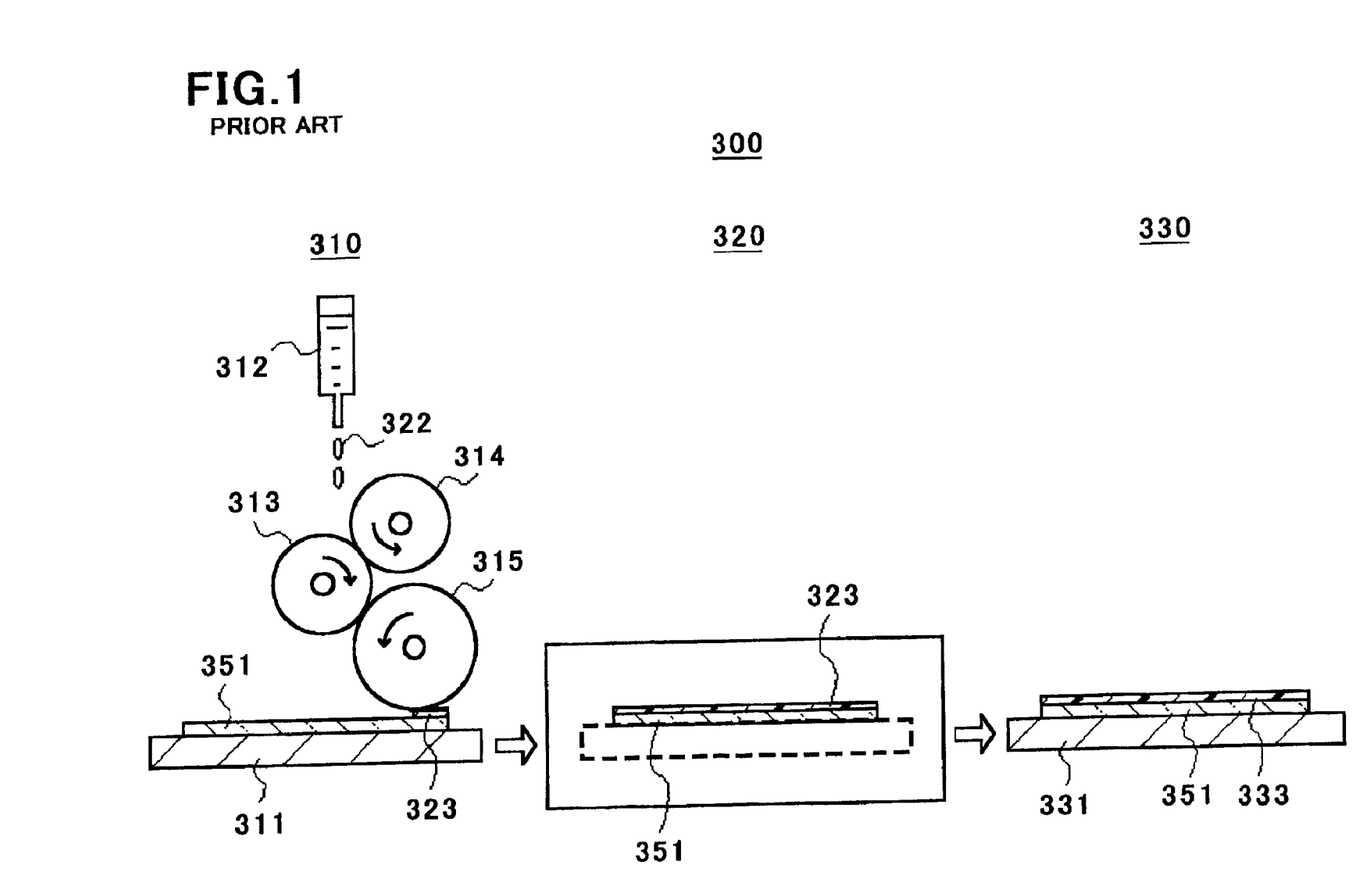
FIG. 1 illustrates a conventional apparatus for forming an alignment film.

FIG. 1 illustrates a conventional apparatus for forming an alignment film. Hereinbelow is explained a conventional method of forming an alignment film, with reference to FIG. 1.

The conventional apparatus 300 illustrating in FIG. 1 is comprised of a first unit 310 for coating a material of which an alignment film is composed, onto a substrate, a second unit 320 for transporting the substrate, and a third unit 330 for drying the material.

First, a transparent substrate 351 such as a glass substrate is placed on a stage 311 in the first unit 310.

A dispenser 312 contains a coating material 322 comprised of organic solvent, and soluble polyimide and/or polyamic acid dissolved in the organic solvent at 1 to 15 wt %.

The coating material 322 is dropped onto a first roll 313 from the dispenser 312. The first roll 313 cooperates with a second roll 314 to keep the coating material 322 at a uniform thickness. The coating material 322 is then transferred onto a surface of a third roll 315. Thereafter, the coating material 322 is printed onto a surface of the transparent substrate 351 at a uniform thickness.

Thus, a pre-alignment film 323 is formed on the transparent substrate 351.

The second unit 320 takes the transparent substrate 351 on which the pre-alignment film 323 is formed, out of the stage 311, and then, puts the transparent substrate 351 onto a hot plate 331 on the third unit 330.

The hot plate 331 is kept being heated at 50 to 100 degrees centigrade. The pre-alignment film 323 is heated by the hot plate 331 for about 30 seconds to about 3 minutes with the result that organic solvent contained in the pre-alignment film 323 is evaporated. The pre-alignment film 323 is thus dried, and resultingly, turned into a second pre-alignment film 333.

After having been dried, the second pre-alignment film 333 is baked at 180 to 250 degrees centigrade for 10 minutes to 3 hours.

Figure 2A:
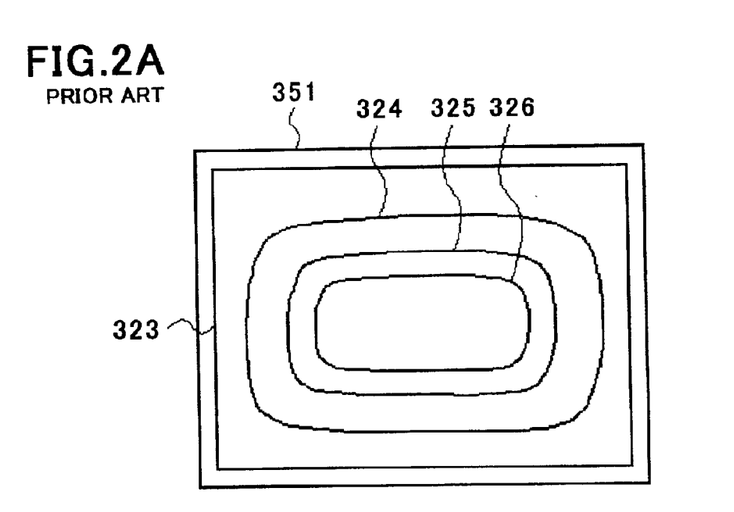
FIG. 2A illustrates development of a dried area in a pre-alignment film in the case that a pre-alignment film is formed entirely over a substrate.

FIG. 2A illustrates development of a dried area in the pre-alignment film 323 in the case that the pre-alignment film 323 is formed entirely over the transparent substrate 351.

As illustrated in FIG. 2A, a dried area in the pre-alignment film 323 develops towards a center from an edge of the transparent substrate 351 with the lapse of time.

Specifically, when ten seconds has passed after commencement of heating the substrate 351, a dried area in the pre-alignment film 323 develops to a line 324, and similarly, when twenty and thirty seconds have passed after commencement of heating the substrate 351, a dried area in the pre-alignment film 323 develops to lines 325 and 326, respectively.

As is readily understood in view of FIG. 2A, a dried area in the pre-alignment film 323 develops at a marginal area more rapidly than at a central area of the pre-alignment film 323.

Figure 2B:
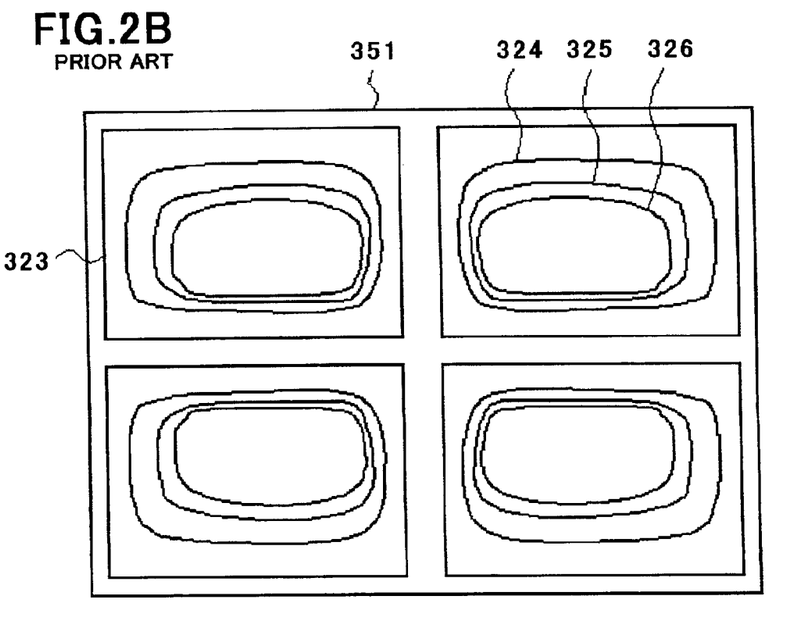
FIG. 2B illustrates development of a dried area in a pre-alignment film in the case that a pre-alignment film is formed in four regions on a substrate.

FIG. 2B illustrates development of a dried area in the pre-alignment film 323 in the case that the pre-alignment film 323 is formed in four regions on the transparent substrate 351.

It is understood in view of FIG. 2B that a dried area in the pre-alignment film 323 develops at a marginal area more rapidly than at a central area of each of the four regions in each of which the pre-alignment film 323 is formed.

Figure 3:
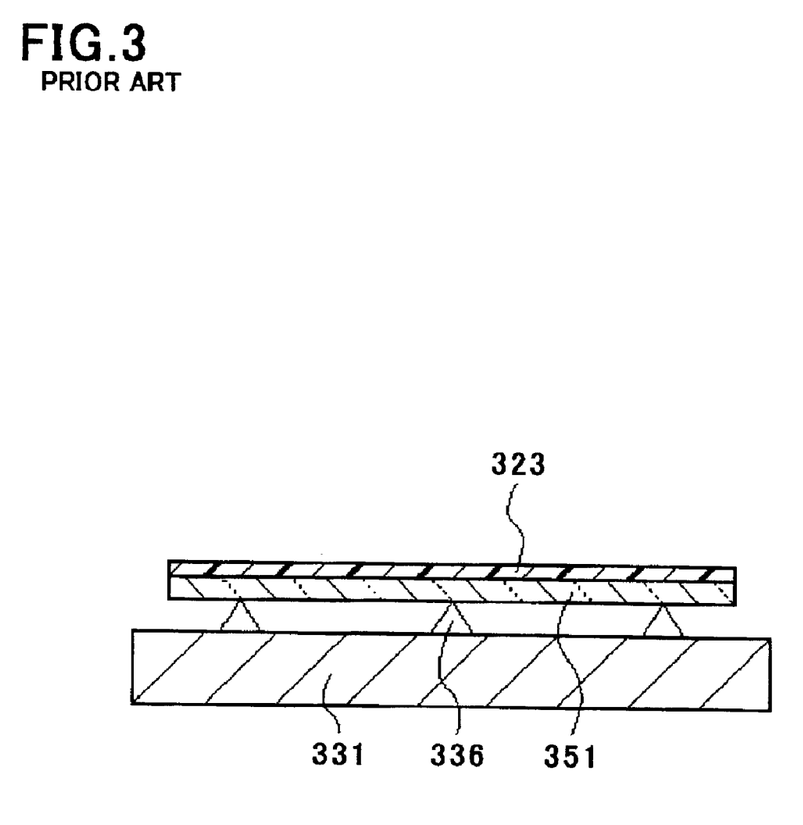
FIG. 3 illustrates another conventional apparatus for forming an alignment film.

FIG. 3 illustrates another conventional method of drying the pre-alignment film 323 formed on the transparent substrate 351.

If the transparent substrate 351 is placed directly on the hot plate 331, the substrate 351 might be electrically charged or contaminants might attach to the substrate 351, when the substrate 351 is peeled off the hot plate 351. In order to prevent the substrate 351 from being electrically charged and contaminants from attaching to the substrate 351, a plurality of pins 336 are formed on the hot plate 331, and the transparent substrate 351 is supported on the pins 336, in the conventional method illustrated in FIG. 3.

In this method, since heat generated in the hot plate 331 is transferred to the pre-alignment film 323 through the pins 336, the pre-alignment film 323 is caused to dry first in an area closer to each of the pins 336.

Accordingly, if the pre-alignment film 323 is rubbed in the above-mentioned condition for making an alignment film, a pre-tilt angle defined by a surface condition of an alignment film and liquid crystal molecules would be caused different from one another in dependence on regions of the alignment film. According to the experiments having been conducted by the inventor, a pre-tilt angle scattered in the range of 4.5 to 6.0 degrees with the result of significant irregularity in displayed images.

SUMMARY OF THE INVENTION

In view of the above-mentioned problem in the conventional liquid crystal display device, it is an object of the present invention to provide a method of fabricating a liquid crystal display device, a method of drying a material of which an alignment film is composed in a process of fabrication of a liquid crystal display device, and an apparatus for drying a material of which an alignment film is composed in a process of fabrication of a liquid crystal display device, all of which are capable of uniformly drying a pre-alignment film to thereby remove organic solvent therefrom in a step of drying a pre-alignment film composed of a combination of organic solvent and organic materials.

Non-uniformity in drying a material of which an alignment film is composed was conventionally considered because of non-uniformity in transfer of heat to the material.

However, the inventor discovered the fact that if gas was blown to a substrate for about three seconds at the same time of placing the substrate on a hot plate, non-uniformity in drying a material of which an alignment film is composed could be eliminated. Since it is considered that a temperature of the substrate does not go up to a desired temperature in about three seconds, it is considered that the above-mentioned phenomenon indicates that evaporation of organic solvent out of a pre-alignment film is facilitated more effectively by exhausting solvent gas existing in the vicinity of a surface of the a pre-alignment film than by merely heating the material for evaporating organic solvent out of the material. In other words, it was found out that drying a pre-alignment film is dependent on a gas density of solvent existing in the vicinity of a surface of the pre-alignment film.

The present invention is based on the above-mentioned discovery.

In one aspect of the present invention, there is provided a method of fabricating a liquid crystal display device, including the steps of (a) coating a material of which an alignment film is composed, on first and second substrates, (b) blowing gas to a surface of the material to dry the material, (c) rubbing the material for forming the alignment film, and (d) arranging the first and second substrates such that the alignment films formed on the first and second substrates face each other, and filling a gap formed between the first and second substrates with liquid crystal.

It is preferable that the gas is comprised of or contains at least one of air and nitrogen gas, in which case, the air contains preferably no humidity.

For instance, the gas may be blown to a surface of the material in the step (b) at a flow rate in the range of 1 $m^3$/minute to 5 $m^3$/minute both inclusive.

In another aspect of the present invention, there is provided a method of drying a material of which an alignment film is composed in a process of fabrication of a liquid crystal display device, including the step of blowing gas to a surface of the material.

In still another aspect of the present invention, there is provided an apparatus for drying a material of which an alignment film is composed in a process of fabrication of a liquid crystal display device, including (a) a first unit for coating the material onto a substrate, and (b) a second unit for blowing gas to a surface of the material to dry the material.

It is preferable that the second unit blows gas which is comprised of or contains at least one of air and nitrogen gas, in which case, the air contains preferably no humidity.

For instance, the second unit blows the gas to a surface of the material at a flow rate in the range of 1 $m^3$/minute to 5 $m^3$/minute both inclusive.

It is preferable that the second unit includes a stage on which the substrate is to be placed and which is equipped with no heaters.

It is preferable that the second unit includes a heater for heating the material, in which case, the heater may be comprised of at least one of an infra-red irradiator and a micro-wave irradiator.

The advantages obtained by the aforementioned present invention will be described hereinbelow.

In accordance with the present invention, a pre-alignment film is dried by blowing gas thereto in a process of forming an alignment film. In comparison with a conventional method in which a pre-alignment film is dried by means of a hot plate, the present invention makes it possible to significantly reduce variance in a pre-tilt angle of liquid crystal after rubbing a pre-alignment film, ensuring reduction non-uniformity in image display in a liquid crystal display device.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 4:
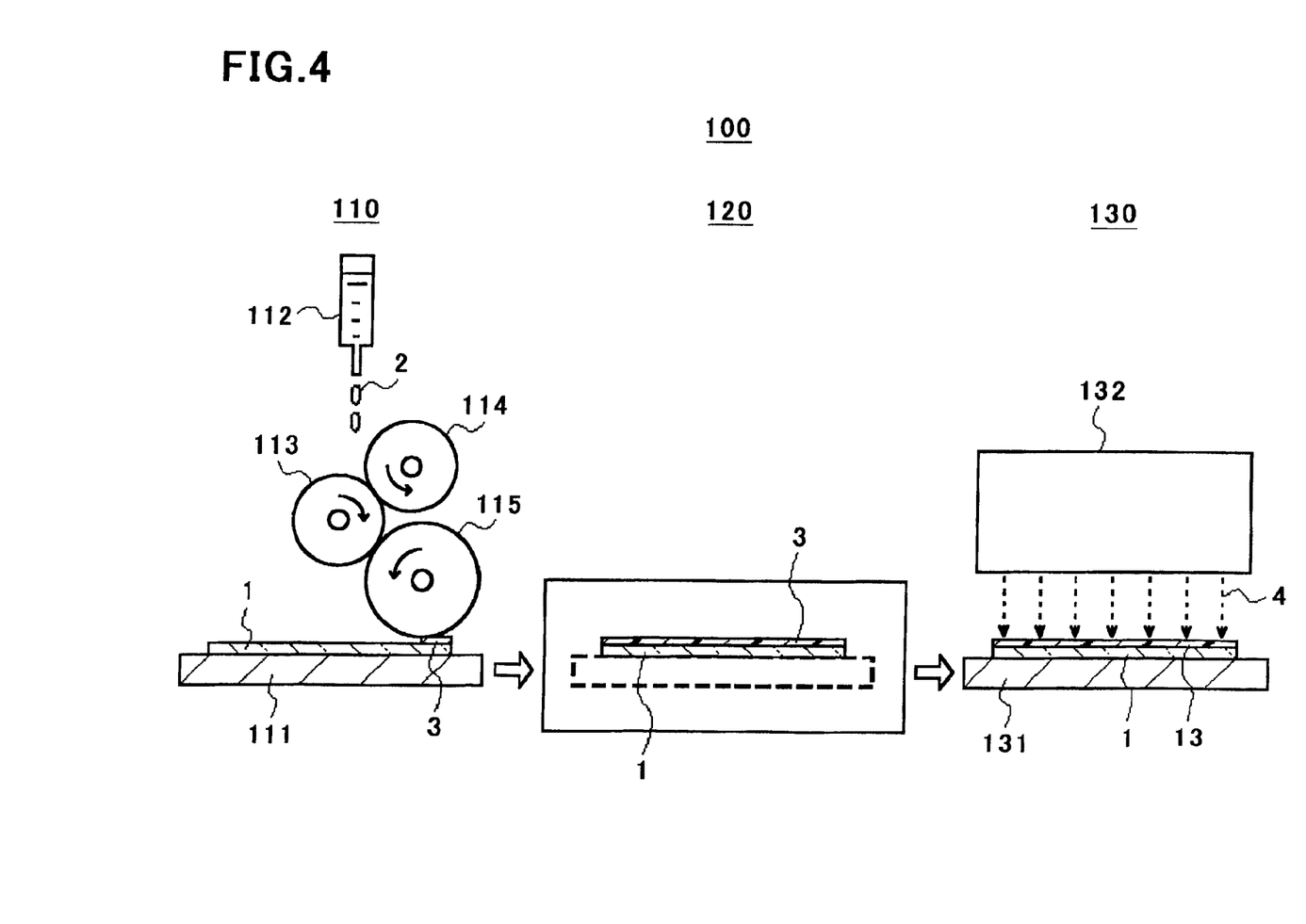
FIG. 4 illustrates an apparatus for forming an alignment film, to which a method of fabricating a liquid crystal display device, in accordance with the first embodiment of the present invention, is applied.

FIG. 4 illustrates an apparatus for forming an alignment film, to which a method of fabricating a liquid crystal display device, in accordance with the first embodiment, is applied.

The apparatus 100 illustrating in FIG. 4 is comprised of a first unit 110 for coating a material of which an alignment film is composed, onto a substrate, a second unit 120 for transporting the substrate, and a third unit 130 for drying the material.

First, a substrate 1 is placed on a stage 111 in the first unit 110.

A dispenser 112 contains a coating material 2 composed of organic solvent into which organic materials are dissolved.

The coating material 2 is dropped onto a first roll 113 from the dispenser 112. The first roll 113 cooperates with a second roll 114 to keep the coating material 2 at a uniform thickness. The coating material 2 is then transferred onto a surface of a third roll 115. Thereafter, the coating material 2 is printed onto a surface of the substrate 1 at a uniform thickness.

Thus, a pre-alignment film 3 is formed on the substrate 1.

The second unit 120 takes the substrate 1 on which the pre-alignment film 3 is formed, out of the stage 111 by means of arms (not illustrated), and then, puts the substrate 1 onto a stage 131 on the third unit 130.

The third unit 130 includes a gas-blower 132. After the substrate 1 has been put on the stage 131, the gas-blower 132 blows dry air 4 to the pre-alignment film 3 for 5 to 30 seconds at a flow rate in the range of 1 m³/minute to 5 m³/minute. If the flow rate of the dry air 4 were set smaller, the dry air 4 is blown to the pre-alignment film 3 for a longer period of time, and in contrast, if the flow rate of the dry air 4 were set higher to such a degree that the pre-alignment film 3 is not physically damaged by the dry air 4, the dry air 4 is blown to the pre-alignment film 3 for a shorter period of time.

By blowing the dry air 4 to the pre-alignment film 3, organic solvent contained in the pre-alignment film 3 is removed. As a result, the pre-alignment film 3 is turned into a second pre-alignment film 13.

After having been thus dried, the second pre-alignment film 13 is transferred to another stage in the third unit 130, or the stage 131 moves in the third unit 130, and then, the second pre-alignment film 13 is baked at 180 to 250 degrees centigrade for 10 minutes to 3 hours.

The second pre-alignment film 13 formed in the above-mentioned way has an advantage as follows in comparison with an alignment film formed in accordance with a conventional method.

In the above-mentioned conventional method in which a pre-alignment film is dried by means of a hot plate, organic solvent to be removed has a small gas density at a marginal area of the pre-alignment film, and a high gas density at a central area of the pre-alignment film. Hence, when the pre-alignment film is dried for a certain period of time by means of a hot plate, the pre-alignment film would be dried more rapidly at a marginal area than at a central area. That is, a rate at which the pre-alignment film is dried is different between a marginal area and a central area in the pre-alignment film.

In contrast, the dry air 4 is blown uniformly to a surface of the pre-alignment film 3 for drying the pre-alignment film 3 in the first embodiment. Hence, the organic solvent gas existing in the vicinity of a surface of the pre-alignment film 3 is compulsorily and uniformly blown off, making it possible to uniformize a rate at which the pre-alignment film 3 is dried, entirely over the pre-alignment film 3, and shorten a period of time necessary for drying the pre-alignment film 3.

Thus, the method in accordance with the first embodiment would eliminate defects caused by variance in a rate at which the pre-alignment film 3 is dried.

Though the dry air 4 is used for drying the pre-alignment film 3 in the first embodiment, air and/or nitrogen gas may be used in place of the dry air 4. Any gas may be used for drying the pre-alignment film 3, if it has a function of blowing off organic solvent existing in the vicinity of a surface of the pre-alignment film 3, unless it exerts physical or chemical influence on the pre-alignment film 3.

In the first embodiment, the dry air 4 is blown vertically to the pre-alignment film 3, as illustrated in FIG. 4, but it should be noted that a direction in which the dry air 4 is blown to the pre-alignment film 3 is not to be limited to a vertical direction. For instance, the dry air 4 may be blown obliquely to the pre-alignment film 3.

The stage 131 in the first embodiment is described merely as a stage on which the substrate 1 is to be placed. However, the stage 131 may be equipped with a heater such as an infra-red irradiator or a micro-wave irradiator.

[Second Embodiment]

Figure 5:
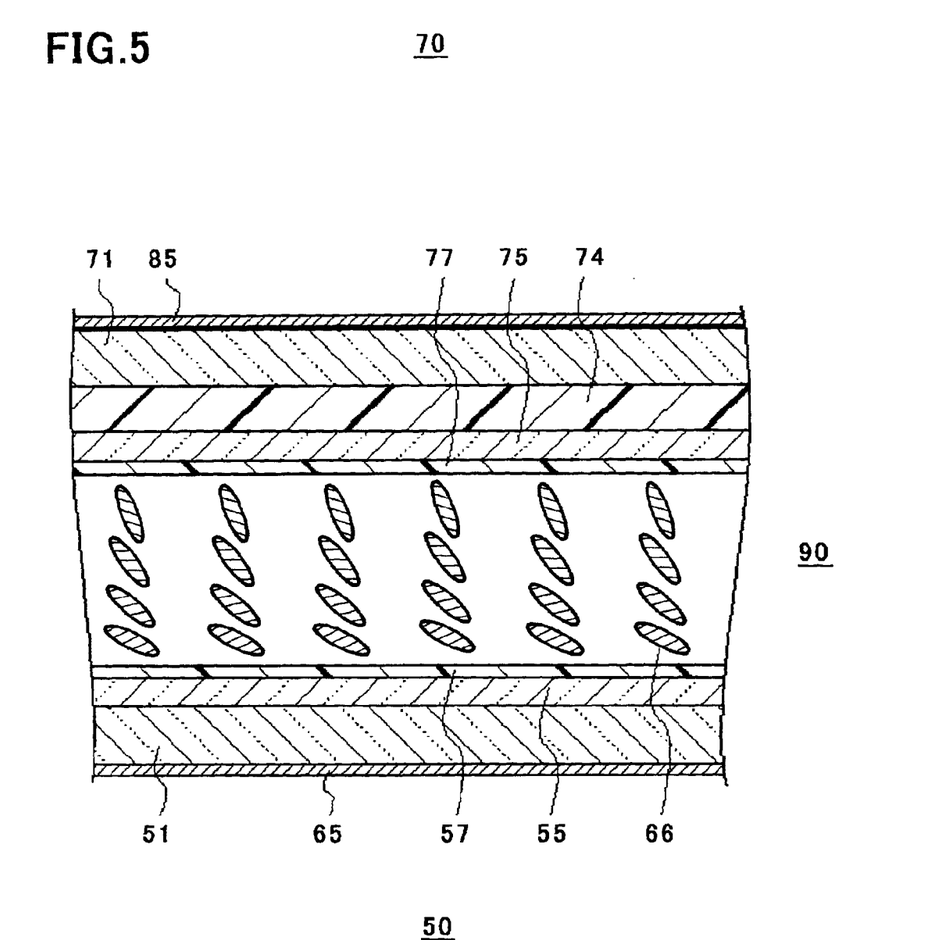
FIG. 5 is a cross-sectional view of a liquid crystal display device to which a method of fabricating a liquid crystal display device, in accordance with the second embodiment of the present invention, is applied.
Figure 6:
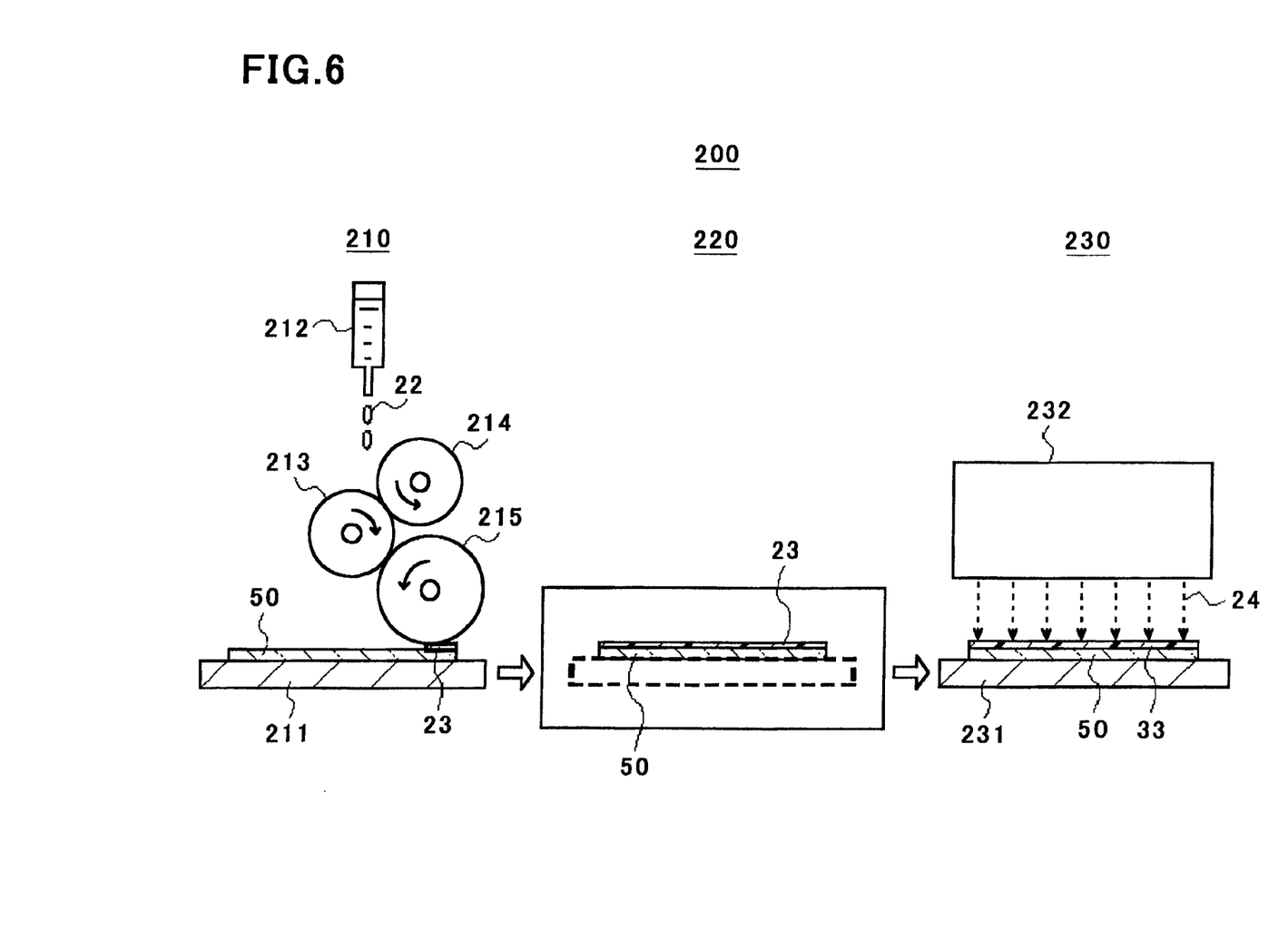
FIG. 6 illustrates an apparatus for forming an alignment film, to which a method of fabricating a liquid crystal display device, in accordance with the second embodiment of the present invention, is applied.

FIG. 5 is a cross-sectional view of a twisted nematic (TN) type liquid crystal display device to which a method of fabricating a liquid crystal display device, in accordance with the second embodiment, is applied, and FIG. 6 illustrates an apparatus for forming an alignment film, to which a method of fabricating a liquid crystal display device, in accordance with the second embodiment, is applied.

The liquid crystal display device illustrated in FIG. 5 is comprised of a liquid crystal cell 90 and a pair of polarizers 65 and 85 arranged on opposite surfaces of the liquid crystal cell 90.

The liquid crystal cell 90 is comprised of a TFT substrate 50 including a thin film transistor (not illustrated), an opposing substrate 70 arranged in facing relation with the TFT substrate 50, and liquid crystal 66 sandwiched between the TFT substrate 50 and the opposing substrate 70.

The TFT substrate 50 and the opposing substrate 70 are adhered to each other with spacers (not illustrated) being sandwiched therebetween for ensuring a gap therebetween into which the liquid crystal 66 is inserted, and are hermetically sealed to each other at marginal area through a frame-shaped seal (not illustrated) for preventing the liquid crystal 66 from leaking out.

The TFT substrate 50 is comprised of a transparent substrate 51, a transparent electrode 55 formed on the transparent substrate 51, and an alignment film 57 formed on the transparent electrode 55. The polarizer 65 is formed on a lower surface of the transparent substrate 51.

The opposing substrate 70 is comprised of a transparent substrate 71, a color filter 74 formed on the transparent substrate 71, a transparent electrode 75 formed on the color filter 74, and an alignment film 77 formed on the transparent electrode 75. The polarizer 85 is formed on an upper surface of the transparent substrate 71.

The TFT substrate 50 and the opposing substrate 70 are adhered to each other such that the alignment films 57 and 77 face each other.

The transparent substrates 51 and 71 in the second embodiment are composed of glass. As an alternative, the transparent substrates 51 and 71 may be composed of plastic or quartz glass.

The transparent electrode 75 formed above the substrate 71 acts as a common electrode, and the transparent electrode 55 formed on the substrate 51 acts as a pixel electrode.

The alignment films 57 and 77 align the liquid crystal molecules 66 in directions perpendicular to each other, respectively. The liquid crystal molecules 66 sandwiched between the TFT substrate 50 and the opposing substrate 70 are controlled by the alignment films 57 and 77 with respect to a direction in which the liquid crystal molecules 66 are aligned. Specifically, the liquid crystal molecules 66 are aligned in twisted condition at a twisting angle of about 90 degrees.

The liquid crystal display device fabricated in accordance with the second embodiment is a normally white mode one. The polarizers 65 and 85 are designed to have transmission axes perpendicular to each other, and in addition, the polarizer 85 in the opposing substrate 70 is designed to have a transmission axis almost in parallel with a direction in which the liquid crystal molecules 66 existing in the vicinity of the transparent substrate 71 are aligned, and the polarizer 65 in the TFT substrate 50 is designed to have a transmission axis almost in parallel with a direction in which the liquid crystal molecules 66 existing in the vicinity of the transparent substrate 51 are aligned.

In the liquid crystal display device illustrated in FIG. 5, the liquid crystal molecules 66 have a pre-tilt angle relative to planes defined by the substrates 51 and 71, in the range of 4 to 6 degrees both inclusive.

FIG. 6 illustrates an apparatus for forming an alignment film, to which the method of fabricating a liquid crystal display device, in accordance with the second embodiment, is applied.

The alignment films 57 and 77 are formed by off-set printing through the use of the apparatus illustrated in FIG. 6, as follows.

The apparatus 200 illustrating in FIG. 6 is comprised of a first unit 210 for coating a material of which an alignment film is composed, onto a substrate, a second unit 220 for transporting the substrate, and a third unit 230 for drying the material.

First, the TFT substrate 50 is placed on a stage 211 in the first unit 210. Herein, it is assumed that the alignment film 57 is not yet formed on the TFT substrate 50.

A dispenser 212 contains a coating material 22 comprised of organic solvent to which organic materials are dissolved at 1 to 15 wt %. As the organic solvent, for instance, NMP, γ-butyrolactone, dipropyleneglycol monomethylether, or butyl Cellosolve (ethyleneglycol monomethylether) may be used. As the organic materials, for instance, soluble polyimide or polyamic acid may be used.

The coating material 22 is dropped onto a first roll 213 from the dispenser 212. The first roll 213 cooperates with a second roll 214 to keep the coating material 22 at a uniform thickness. The coating material 22 is then transferred onto a surface of a third roll 215. Thereafter, the coating material 22 is printed onto a surface of the TFT substrate 50 at a uniform thickness as a pre-alignment film 23.

Thus, the pre-alignment film 23 is formed on the TFT substrate 50.

The second unit 220 takes the TFT substrate 50 on which the pre-alignment film 23 is formed, out of the stage 211 by means of arms (not illustrated), and then, puts the TFT substrate 50 onto a stage 231 on the third unit 230.

The third unit 230 includes a gas-blower 232. After the TFT substrate 50 has been put on the stage 231, the gas-blower 232 blows nitrogen ($N_2$) gas 24 to the pre-alignment film 23 for 5 to 30 seconds at a flow rate in the range of 1 $m^3$/minute to 5 $m^3$/minute. If the flow rate of the nitrogen gas 24 were set smaller, the nitrogen gas 24 is blown to the pre-alignment film 23 for a longer period of time, and in contrast, if the flow rate of the nitrogen gas 24 were set higher to such a degree that the pre-alignment film 23 is not physically damaged by the nitrogen gas 24, the nitrogen gas 24 is blown to the pre-alignment film 23 for a shorter period of time.

By blowing the nitrogen gas 24 to the pre-alignment film 23, the organic solvent contained in the pre-alignment film 23 is removed. As a result, the pre-alignment film 23 is turned into a second pre-alignment film 33.

After having been thus dried, the second pre-alignment film 33 is transferred to another stage in the third unit 230, or the stage 231 moves in the third unit 230, and then, the second pre-alignment film 33 is baked at 180 to 250 degrees centigrade for 10 minutes to 3 hours.

The second pre-alignment film 33 formed in the above-mentioned way has an advantage as follows in comparison with an alignment film formed in accordance with a conventional method.

In the above-mentioned conventional method in which a pre-alignment film is dried by means of a hot plate, organic solvent to be removed has a small gas density at a marginal area of the pre-alignment film, and a high gas density at a central area of the pre-alignment film. Hence, when the pre-alignment film is dried for a certain period of time by means of a hot plate, the pre-alignment film would be dried more rapidly at a marginal area than at a central area. That is, a rate at which the pre-alignment film is dried is different between a marginal area and a central area in the pre-alignment film.

In contrast, the nitrogen gas 24 is blown uniformly to a surface of the pre-alignment film 23 for drying the pre-alignment film 23 in the second embodiment. Hence, the organic solvent gas existing in the vicinity of a surface of the pre-alignment film 23 is compulsorily and uniformly blown off, making it possible to uniformize a rate at which the pre-alignment film 23 is dried, entirely over the pre-alignment film 23, and shorten a period of time necessary for drying the pre-alignment film 23.

Thus, the method in accordance with the second embodiment would eliminate defects caused by variance in a rate at which the pre-alignment film 23 is dried.

The stage 231 in the second embodiment is described merely as a stage on which the TFT substrate 50 is to be placed. However, the stage 231 may be equipped with a heater such as an infra-red irradiator or a micro-wave irradiator, similarly to the stage 131 in the first embodiment.

In the same way as mentioned above, the second pre-alignment film 33 is formed on the transparent electrode 75 in the opposing substrate 70.

When the TFT substrate 50 and the opposing substrate 70 are arranged in facing relation to each other, the second pre-alignment films 33 formed on the transparent electrodes 55 and 75 are rubbed such that the second pre-alignment films 33 have alignment axes of 90 degrees. As a result, the second pre-alignment films 33 are turned into the alignment films 57 and 77.

Then, the polarizers 65 and 85 are attached to the TFT substrate 50 and the opposing substrate 70, respectively, at the opposite side of the alignment films 57 and 77.

Then, the TFT substrate 50 and the opposing substrate 70 are assembled to a cell, and the liquid crystal 66 is poured into a gap formed between the TFT substrate 50 and the opposing substrate 70.

Thus, there is completed the liquid crystal display device illustrated in FIG. 5.

The inventor measured a variance of a pre-tilt angle of the liquid crystal molecules 66 in the thus fabricated liquid crystal display device. The pre-tilt angle was in the range of 4.5 to 5.0 degrees, which is significantly improved in comparison with a variance of the same in a conventional liquid crystal display device, which variance was in the range of 4.5 to 6.0 degrees.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-187224 filed on Jun. 20, 2001 including specification, claims, drawings and summary is incorporated herein by reference in its entirety.

What is claimed is:

1. A method of fabricating a liquid crystal display device, comprising the steps of:
   (a) coating a material of which an alignment film is composed, on first and second substrates;
   (b) blowing gas to a surface of said material to dry said material, wherein said gas blown on said surface does not heat said material and dries the surface of said material at a substantially uniform rate;
   (c) after drying the material, rubbing said material for forming said alignment film; and
   (d) arranging said first and second substrates such that said alignment films formed on said first and second substrates face each other, and filling a gap formed between said first and second substrates with liquid crystal.

2. The method as set forth in claim 1, wherein said gas is comprised of or contains at least one of air and nitrogen gas.

3. The method as set forth in claim 2, wherein said air contains no humidity.

4. The method as set forth in claim 1, wherein said gas is blown to a surface of said material in said step (b) at a flow rate in the range of 1 $m^3$/minute to 5 $m^3$/minute both inclusive.

5. A method of drying a material of which an alignment film is composed in a process of fabrication of a liquid crystal display device, comprising the steps of blowing gas to a surface of said material, wherein said gas blown on said surface does not heat said material and dries the surface of said material at a substantially uniform rate and, after drying said material, forming said alignment film.

6. The method as set forth in claim 5, wherein said gas is comprised of or contains at least one of air and nitrogen gas.

7. The method as set forth in claim 6, wherein said air contains no humidity.

8. The method as set forth in claim 5, wherein said gas is blown to a surface of said material at a flow rate in the range of 1 $m^3$/minute to 5 $m^3$/minute both inclusive.

9. An apparatus for drying a material of which an alignment film is composed in a process of fabrication of a liquid crystal display device, comprising:
   (a) a first unit for coating said material onto a substrate; and
   (b) a second unit for blowing gas to a surface of said material to dry said material,
wherein said gas blown on said surface does heat said material, and wherein said second unit blows the gas to dry the surface of said material at a substantially uniform rate and before the alignment film is formed.

10. The apparatus as set forth in claim 9, wherein said second unit blows gas which is comprised of or contains at least one of air and nitrogen gas.

11. The apparatus as set forth in claim 10, wherein said air contains no humidity.

12. The apparatus as set forth in claim 9, wherein said second unit blows said gas to a surface of said material at a flow rate in the range of 1 $m^3$/minute to 5 $m^3$/minute both inclusive.

13. The apparatus as set forth in claim 9, wherein said second unit includes a stage on which said substrate is to be placed and which is equipped with no heaters.

14. The apparatus as set forth in claim 9, wherein said second unit includes a heater for heating said material.

15. The apparatus as set forth in claim 14, wherein said heater is comprised of at least one of an infra-red irradiator and a micro-wave irradiator.

* * * * *